(12) United States Patent
Rosa et al.

(10) Patent No.: US 10,461,895 B2
(45) Date of Patent: Oct. 29, 2019

(54) TRANSMISSION OF UPLINK CONTROL INFORMATION IN UNLICENSED SPECTRUM

(71) Applicant: Nokia Technologies Oy, Espoo (FI)

(72) Inventors: Claudio Rosa, Randers NV (DK); Esa Tiirola, Kempele (FI); Kari Hooli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 48 days.

(21) Appl. No.: 15/574,953

(22) PCT Filed: May 3, 2016

(86) PCT No.: PCT/FI2016/050282
§ 371 (c)(1),
(2) Date: Nov. 17, 2017

(87) PCT Pub. No.: WO2016/198734
PCT Pub. Date: Dec. 15, 2016

(65) Prior Publication Data
US 2018/0175973 A1 Jun. 21, 2018

Related U.S. Application Data

(60) Provisional application No. 62/174,921, filed on Jun. 12, 2015.

(51) Int. Cl.
*H04L 1/18* (2006.01)
*H04L 5/00* (2006.01)
(Continued)

(52) U.S. Cl.
CPC .......... *H04L 1/1812* (2013.01); *H04L 1/1854* (2013.01); *H04L 1/1858* (2013.01);
(Continued)

(58) Field of Classification Search
CPC ... H04L 1/1812; H04L 1/1861; H04L 1/1854; H04L 1/1858; H04L 5/0055; H04L 1/1671; H04L 27/0006
See application file for complete search history.

(56) References Cited

U.S. PATENT DOCUMENTS 8,004,992 B2  8/2011  Abraham et al.
8,483,698 B2  7/2013  Papasakellariou et al.
(Continued)

FOREIGN PATENT DOCUMENTS

EP  2293619 A1  3/2011

OTHER PUBLICATIONS

Panasonic, Way forward on the Uplink ACK/NACK repetition for PUCCH, 3GPP TSG RAN WG1 Meeting #54, Warsaw, Poland, Jun. 30-Jul. 4, 2008, R1-082402. (Year: 2008).*
(Continued)

*Primary Examiner* — Shailendra Kumar
(74) *Attorney, Agent, or Firm* — Harrington & Smith

(57) ABSTRACT

Systems, methods, apparatuses, and computer program products for the transmission of uplink (UL) control information via unlicensed spectrum are provided. One method includes dynamically allocating, by a network node, control channel resources for transmitting of uplink control information (UCI). The method may also include scheduling a user equipment with multiple transmission opportunities for each hybrid automatic repeat request (HARQ) acknowledgement/non-acknowledgement (A/N) on the control channel in multiple uplink subframes.

20 Claims, 15 Drawing Sheets

(51) Int. Cl.
*H04L 27/00* (2006.01)
*H04L 1/16* (2006.01)

(52) U.S. Cl.
CPC .......... *H04L 1/1861* (2013.01); *H04L 5/0055* (2013.01); *H04L 1/1671* (2013.01); *H04L 27/0006* (2013.01)

(56) References Cited

U.S. PATENT DOCUMENTS

| | | | |
|---|---|---|---|
| 8,594,017 | B2 | 11/2013 | Xia et al. |
| 2009/0207793 | A1* | 8/2009 | Shen ................... H04L 1/1858 370/329 |
| 2012/0201120 | A1 | 8/2012 | Zhang et al. |
| 2013/0235768 | A1 | 9/2013 | Earnshaw et al. |
| 2014/0233469 | A1* | 8/2014 | Seo ..................... H04L 5/001 370/329 |
| 2015/0098437 | A1 | 4/2015 | Chen et al. |
| 2016/0278074 | A1* | 9/2016 | Yang ................... H04L 1/1812 |

OTHER PUBLICATIONS

"Study on Licensed-Assisted Access using LTE", 3GPP TSG-RAN meeting #65, RP-141646, Agenda: 14.1.1, Ericsson, Sep. 9-12, 2014, 8 pages.

"Pre-Meeting Coordination Call—LAA", Qualcomm, Apr. 15, 2015, pp. 1-13.

"Broadband Radio Access Networks (BRAN); 5 GHz high performance RLAN; Harmonized EN covering the essential requirements of article 3.2 of the R&TTE Directive", ETSI EN 301 893, V1.7.1 , Jun. 2012, pp. 1-90.

International Search Report and Written Opinion received for corresponding Patent Cooperation Treaty Application No. PCT/FI2016/050282, dated Jul. 13, 2016, 13 pages.

"Way forward on the uplink ACK/NACK repetition for PUCCH", 3GPP TSG-RAN Working Group 1 meeting #54, R1-082402, Agenda: 6.3, Panasonic, Jun. 30-Jul. 4, 2008, pp. 1-2.

"ACK/NACK repetition and Implicit Resource Allocation for PUCCH", 3GPP TSG-RAN Working Group 1 meeting #53, R1-081796, Agenda: 6.1.4, Panasonic, May 5-9, 2008, pp. 1-2.

* cited by examiner

FIG. 1

Principle of PUCCH resource allocation, P=1

| SFN #N+6 | SFN #N+7 | SFN #N+8 | SFN #N+9 |
|---|---|---|---|
| | | | |
| | | | |
| | | | |
| | | | |
| PUCCH (N,0) | PUCCH (N,0) | | |
| PUCCH (N,1) | PUCCH (N,1) | | |
| PUCCH (N,2) | PUCCH (N,2) | | |
| PUCCH (N+1,0) | PUCCH (N+1,0) | PUCCH (N+1,0) | |
| PUCCH (N+1,1) | PUCCH (N+1,1) | PUCCH (N+1,1) | |
| PUCCH (N+1,2) | PUCCH (N+1,2) | PUCCH (N+1,2) | |
| PUCCH (N+2,0) | PUCCH (N+2,0) | PUCCH (N+2,0) | PUCCH (N+2,0) |
| PUCCH (N+2,1) | PUCCH (N+2,1) | PUCCH (N+2,1) | PUCCH (N+2,1) |
| PUCCH (N+2,2) | PUCCH (N+2,2) | PUCCH (N+2,2) | PUCCH (N+2,2) |
| | PUCCH (N+3,0) | PUCCH (N+3,0) | PUCCH (N+3,0) |
| | PUCCH (N+3,1) | PUCCH (N+3,1) | PUCCH (N+3,1) |
| | PUCCH (N+3,2) | PUCCH (N+3,2) | PUCCH (N+3,2) |

Principle of PUCCH resource allocation, P=1

FIG. 1 Continue

| | SFN #N | SFN #N+1 | SFN #N+2 | SFN #N+3 | SFN #N+4 | SFN #N+5 | SFN #N+6 | SFN #N+7 | SFN #N+8 | SFN #N+9 |
|---|---|---|---|---|---|---|---|---|---|---|
| PDCCH resources (CCEs) | PDSCH 0<br>PDSCH 1<br>PDSCH 2 | PDSCH 0<br>PDSCH 1<br>PDSCH 2 | PDSCH 0<br>PDSCH 1<br>PDSCH 2 | PDSCH 0<br>PDSCH 1<br>PDSCH 2 | | | | | | |
| PUCCH resources (code and/or frequency) | | | | | PUCCH (N,0) | | PUCCH (N,0) | | PUCCH (N+4,0) | |
| | | | | | PUCCH (N,1) | | PUCCH (N,1) | | PUCCH (N+4,1) | |
| | | | | | PUCCH (N,2) | | PUCCH (N,2) | | PUCCH (N+4,2) | |
| | | | | | PUCCH (N-3,0) | | PUCCH (N+1,0) | | PUCCH (N+1,0) | |
| | | | | | PUCCH (N-3,1) | | PUCCH (N+1,1) | | PUCCH (N+1,1) | |
| | | | | | PUCCH (N-3,2) | | PUCCH (N+1,2) | | PUCCH (N+1,2) | |
| | | | | | PUCCH (N-2,0) | | PUCCH (N+2,0) | | PUCCH (N+2,0) | |
| | | | | | PUCCH (N-2,1) | | PUCCH (N+2,1) | | PUCCH (N+2,1) | |
| | | | | | PUCCH (N-2,2) | | PUCCH (N+2,2) | | PUCCH (N+2,2) | |
| | | | | | PUCCH (N-1,0) | | PUCCH (N-1,0) | | PUCCH (N+3,0) | |
| | | | | | PUCCH (N-1,1) | | PUCCH (N-1,1) | | PUCCH (N+3,1) | |
| | | | | | PUCCH (N-1,2) | | PUCCH (N-1,2) | | PUCCH (N+3,2) | |

Principle of PUCCH resource allocation, P=2

PUCCH resource allocation operation when LBT blocks transmission on some of subframes (P-1)

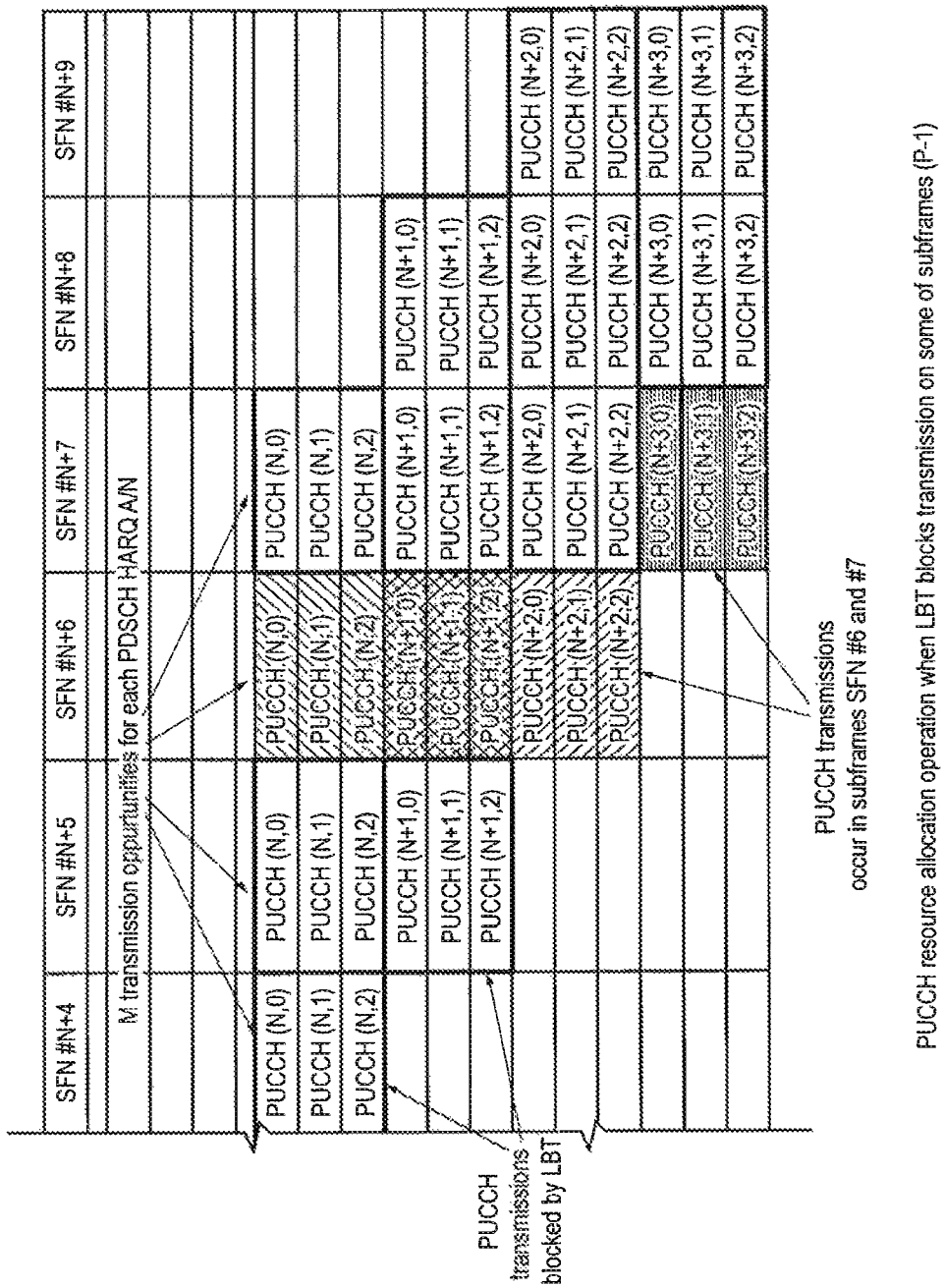
FIG. 3 Continue

FIG. 4

Alternative PUCCH resource allocation method, P=1

| | SFN #N+4 | SFN #N+5 | SFN #N+6 | SFN #N+7 | SFN #N+8 | SFN #N+9 |
|---|---|---|---|---|---|---|
| | PUCCH (N,0) | PUCCH (N+1,0) | PUCCH (N+2,0) | PUCCH (N+3,0) | | |
| | PUCCH (N,1) | PUCCH (N+1,1) | PUCCH (N+2,1) | PUCCH (N+3,1) | | |
| | PUCCH (N,2) | PUCCH (N+1,2) | PUCCH (N+2,2) | PUCCH (N+3,2) | | |
| | | PUCCH (N,0) | PUCCH (N+1,0) | PUCCH (N+2,0) | PUCCH (N+3,0) | |
| | | PUCCH (N,1) | PUCCH (N+1,1) | PUCCH (N+2,1) | PUCCH (N+3,1) | |
| | | PUCCH (N,2) | PUCCH (N+1,2) | PUCCH (N+2,2) | PUCCH (N+3,2) | |
| | | | PUCCH (N,0) | PUCCH (N+1,0) | PUCCH (N+2,0) | PUCCH (N+3,0) |
| | | | PUCCH (N,1) | PUCCH (N+1,1) | PUCCH (N+2,1) | PUCCH (N+3,1) |
| | | | PUCCH (N,2) | PUCCH (N+1,2) | PUCCH (N+2,2) | PUCCH (N+3,2) |

Alternative PUCCH resource allocation method, P=1

FIG. 4 Continue

|  | SFN #N | SFN #N+1 | SFN #N+2 | SFN #N+3 |
|---|---|---|---|---|
| HARQ A/N feedback order per subframe | PDSCH on CC#0<br>PDSCH on CC#1<br>PDSCH on CC#2 | PDSCH on CC#0<br>PDSCH on CC#1<br>PDSCH on CC#2 | PDSCH on CC#0<br>PDSCH on CC#1<br>PDSCH on CC#2 | PDSCH on CC#0<br>PDSCH on CC#1<br>PDSCH on CC#2 |
| HARQ A/N feedback order | | | | |

HARQ A/N feedback ordering, M=4, P=2, fixed codebook size

FIG. 5

| SFN #N+4 | SFN #N+5 | SFN #N+6 | SFN #N+7 | SFN #N+8 | SFN #N+9 |
|---|---|---|---|---|---|
| PUCCH(N,0) | PUCCH(N,0) | PUCCH(N,0) | PUCCH(N,0) | | |
| PUCCH(N,1) | PUCCH(N,1) | PUCCH(N,1) | PUCCH(N,1) | | |
| PUCCH(N,2) | PUCCH(N,2) | PUCCH(N,2) | PUCCH(N,2) | | |
| n/a | PUCCH(N+1,0) | PUCCH(N+1,0) | PUCCH(N+1,0) | PUCCH(N+1,0) | |
| n/a | PUCCH(N+1,1) | PUCCH(N+1,1) | PUCCH(N+1,1) | PUCCH(N+1,1) | |
| n/a | PUCCH(N+1,2) | PUCCH(N+1,2) | PUCCH(N+1,2) | PUCCH(N+1,2) | |
| n/a | n/a | PUCCH(N+2,0) | PUCCH(N+2,0) | PUCCH(N+2,0) | PUCCH(N+2,0) |
| n/a | n/a | PUCCH(N+2,1) | PUCCH(N+2,1) | PUCCH(N+2,1) | PUCCH(N+2,1) |
| n/a | n/a | PUCCH(N+2,2) | PUCCH(N+2,2) | PUCCH(N+2,2) | PUCCH(N+2,2) |
| n/a | n/a | n/a | PUCCH(N+3,0) | PUCCH(N+3,0) | PUCCH(N+3,0) |
| n/a | n/a | n/a | PUCCH(N+3,1) | PUCCH(N+3,1) | PUCCH(N+3,1) |
| n/a | n/a | n/a | PUCCH(N+3,2) | PUCCH(N+3,2) | PUCCH(N+3,2) |

HARQ A/N feedback ordering, M=4, P=2, fixed codebook size

HARQ A/N feedback ordering, M=4, P=2, adaptive codebook size

FIG. 6 Continue

|  | SFN #N | SFN #N+1 | SFN #N+2 | SFN #N+3 |
|---|---|---|---|---|
| HARQ A/N feedback order per subframe | PDSCH on CC#0 / PDSCH on CC#1 / PDSCH on CC#2 | PDSCH on CC#0 / PDSCH on CC#1 / PDSCH on CC#2 |  | PDSCH on CC#0 / PDSCH on CC#1 / PDSCH on CC#2 |
| HARQ A/N feedback order |  |  |  |  |

FIG. 7

Opportunistic HARQ A/N feedback transmission after M LBT-blocked transmission opportunities, M=4, P=2, fixed codebook size

| SFN #N+4 | SFN #N+5 | SFN #N+6 | SFN #N+7 | SFN #N+8 | SFN #N+9 | SFN #N+10 |
|---|---|---|---|---|---|---|
| PDSCH on CC#0 | PUCCH transmissions blocked by LBT — M transmission opportunities for HARQ A/N associated with PDSCH on SFN #N and #N+1 are blocked. | | | PDSCH scheduled on SFBN#N+4 uses the HARQ A/N positions that could opportunistically be used for HARQ A/N for PDSCH scheduled on SFN #N. No HARQ A/N is transmitted for PDSCH on SFN #N | | |
| PDSCH on CC#1 | | | | | | |
| PDSCH on CC#2 | | | | | | |
| PUCCH (N,0) | PUCCH (N,0) | PUCCH (N,0) | PUCCH (N,0) | PUCCH (N+4,0) | PUCCH (N+4,0) | PUCCH (N+4,0) |
| PUCCH (N,1) | PUCCH (N,1) | PUCCH (N,1) | PUCCH (N,1) | PUCCH (N+4,1) | PUCCH (N+4,1) | PUCCH (N+4,1) |
| PUCCH (N,2) | PUCCH (N,2) | PUCCH (N,2) | PUCCH (N,2) | PUCCH (N+4,2) | PUCCH (N+4,2) | PUCCH (N+4,2) |
| n/a | PUCCH (N+1,0) | PUCCH (N+1,0) | PUCCH (N+1,0) | PUCCH (N+4,2) | PUCCH (N+1,0) | n/a |
| n/a | PUCCH (N+1,1) | PUCCH (N+1,1) | PUCCH (N+1,1) | PUCCH (N+4,2) | PUCCH (N+1,1) | n/a |
| n/a | PUCCH (N+1,2) | PUCCH (N+1,2) | PUCCH (N+1,2) | PUCCH (N+4,2) | PUCCH (N+1,2) | n/a |
| n/a | n/a | n/a | n/a | n/a | n/a | n/a |
| n/a | n/a | n/a | n/a | n/a | n/a | n/a |
| n/a | n/a | n/a | n/a | n/a | n/a | n/a |
| n/a | n/a | PUCCH (N+3,0) | PUCCH (N+3,0) | PUCCH (N+4,2) | PUCCH (N+3,0) | PUCCH (N+3,0) |
| n/a | n/a | PUCCH (N+3,1) | PUCCH (N+3,1) | PUCCH (N+4,2) | PUCCH (N+3,1) | PUCCH (N+3,1) |
| n/a | n/a | PUCCH (N+3,2) | PUCCH (N+3,2) | PUCCH (N+4,2) | PUCCH (N+3,2) | PUCCH (N+3,2) |

No PDSCH was scheduled on SFN #N+5, so HARQ A/N positions can opportunistically be used for HARQ A/N associated with PDSCH on SFN #N+1.

Opportunistic HARQ A/N feedback transmission after M LBT-blocked transmission opportunities, M=4, P=2, fixed codebook size

FIG. 7 Continue

TRANSMISSION OF UPLINK CONTROL INFORMATION IN UNLICENSED SPECTRUM

RELATED APPLICATION

This application was originally filed as PCT Application No. PCT/FI2016/050282 filed May 3, 2016 which claims priority benefit from U.S. Application No. 62/174921, filed Jun. 12, 2015.

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A, introduced in LTE Rel-10, is carrier aggregation, which allows for increasing the data rates through aggregation of two or more LTE carriers.

SUMMARY

One embodiment is directed to an apparatus, which may include at least one processor and at least one memory including computer program code. The at least one memory and computer program code may be configured, with the at least one processor, to cause the apparatus at least to dynamically allocate control channel resources for the transmitting of UCI via the unlicensed or shared spectrum or via the LAA cell. In an embodiment, the at least one memory and computer program code may be further configured, with the at least one processor, to cause the apparatus at least to schedule a UE with multiple transmission opportunities for each HARQ A/N on the control channel in multiple UL subframes. In certain embodiments, the at least one memory and computer program code may be further configured, with the at least one processor, to cause the apparatus at least to map HARQ A/N based on the same CCEs used in M consecutive DL subframes to different control channel resources. According to another embodiment, the at least one memory and computer program code may be further configured, with the at least one processor, to cause the apparatus at least to map HARQ A/N feedback for each DL subframe to many UL subframe opportunities with varying timing. In certain embodiments, the control channel may be an uplink control channel, such as PUCCH. In one embodiment, the at least one memory and computer program code may be further configured, with the at least one processor, to cause the apparatus at least to guarantee the UE the uplink control channel resource in M consecutive UL subframes.

Another embodiment is directed to a method, which may include dynamically allocating control channel resources for the transmitting of UCI via the unlicensed or shared spectrum or via the LAA cell. In an embodiment, the method may include scheduling a UE with multiple transmission opportunities for each HARQ A/N on the control channel in multiple UL subframes. In certain embodiments, the method may include mapping HARQ A/N based on the same CCEs used in M consecutive DL subframes to different uplink control channel resources. According to another embodiment, the method may include mapping HARQ A/N feedback for each DL subframe to many UL subframe opportunities with varying timing. In certain embodiments, the control channel may be an uplink control channel, such as PUCCH. In one embodiment, the method may further include guaranteeing the UE the uplink control channel resource in M consecutive UL subframes.

Another embodiment is directed to an apparatus that may include means for dynamically allocating control channel resources for the transmitting of UCI via the unlicensed or shared spectrum or via the LAA cell. In an embodiment, the apparatus may include means for scheduling a UE with multiple transmission opportunities for each HARQ A/N on the control channel in multiple UL subframes. In certain embodiments, the apparatus may include means for mapping HARQ A/N based on the same CCEs used in M consecutive DL subframes to different uplink control channel resources. According to another embodiment, the apparatus may include means for mapping HARQ A/N feedback for each DL subframe to many UL subframe opportunities with varying timing. In certain embodiments, the control channel may be an uplink control channel, such as PUCCH. In one embodiment, the apparatus may include means for guaranteeing the UE the uplink control channel resource in M consecutive UL subframes.

Another embodiment is directed to an apparatus, which may include at least one processor and at least one memory including computer program code. The at least one memory and computer program code may be configured, with the at least one processor, to cause the apparatus at least to transmit UCI via the unlicensed or shared spectrum or via the LAA cell in at least one of multiple transmission opportunities scheduled by a network node (e.g., eNB). More specifically, according to an embodiment, the transmitting of the UCI may include transmitting HARQ A/N via the unlicensed or shared spectrum or via the LAA cell on control channel resources dynamically allocated by the network node. According to one embodiment, the apparatus may be scheduled for downlink data in DL subframe #N and is guaranteed control channel resources in M consecutive UL subframes. In this embodiment, if the LBT procedure performed by the apparatus just before UL subframe #N+K fails or if the apparatus knows the corresponding subframe is not an UL subframe, the apparatus may be controlled to repeat the same procedure for the next M−1 UL subframes. When the LBT procedure succeeds, the apparatus may be controlled to start transmission of HARQ A/N using the control channel resources determined for DL subframe SFN #N. In an embodiment, the apparatus transmits each HARQ A/N only once. Alternatively, the apparatus may be controlled to start transmission of HARQ A/N using a uplink control channel format (e.g. PUCCH format 3) capable to contain multiple bits, wherein bit positions are reserved for HARQ A/N for M DL subframes. In an embodiment, the apparatus transmits each HARQ A/N up to M times. The PUCCH resource may be indicated in DL assignment for subframe #N or in a later DL assignment. In certain embodiments, the control channel may be an uplink control channel, such as PUCCH. In one embodiment, the apparatus is guaranteed the uplink control channel resource in M consecutive UL subframes.

Another embodiment is directed to a method that may include transmitting, by a UE, UCI via the unlicensed or shared spectrum or via the LAA cell in at least one of multiple transmission opportunities scheduled by a network node (e.g., eNB). More specifically, according to an embodiment, the transmitting of the UCI may include transmitting HARQ A/N via the unlicensed or shared spectrum or via the LAA cell on control channel resources dynamically allocated by the network node. According to one embodiment, the UE may be scheduled for downlink data in DL subframe #N and is guaranteed control channel resources in M consecutive UL subframes. In this embodiment, if the LBT procedure performed by the UE just before UL subframe #N+K fails or if the UE knows the corresponding subframe is not an UL subframe, the method may include repeating the same procedure for the next M−1 UL subframes. When the LBT procedure succeeds, the method may include starting transmission of HARQ A/N using the control channel resources determined for DL subframe SFN #N. In an embodiment, the UE transmits each HARQ A/N only once. Alternatively, the method may include starting transmission of HARQ A/N using a uplink control channel format (e.g. PUCCH format 3) capable to contain multiple bits, wherein bit positions are reserved for HARQ A/N for M DL subframes. In an embodiment, the UE may transmit each HARQ A/N up to M times. The PUCCH resource may be indicated in DL assignment for subframe #N or in a later DL assignment. In certain embodiments, the control channel may be an uplink control channel, such as PUCCH. In one embodiment, the UE is guaranteed the uplink control channel resource in M consecutive UL subframes.

Another embodiment is directed to an apparatus, which may include means for transmitting UCI via the unlicensed or shared spectrum or via the LAA cell in at least one of multiple transmission opportunities scheduled by a network node (e.g., eNB). More specifically, according to an embodiment, the means for transmitting of the UCI may include means for transmitting HARQ A/N via the unlicensed or shared spectrum or via the LAA cell on control channel resources dynamically allocated by the network node. According to one embodiment, the apparatus may be scheduled for downlink data in DL subframe #N and is guaranteed control channel resources in M consecutive UL subframes. In this embodiment, if the LBT procedure performed by the apparatus just before UL subframe #N+K fails or if the apparatus knows the corresponding subframe is not an UL subframe, the apparatus may include means for repeating the same procedure for the next M−1 UL subframes. When the LBT procedure succeeds, the apparatus may include means for starting transmission of HARQ A/N using the control channel resources determined for DL subframe SFN #N. In an embodiment, the apparatus transmits each HARQ A/N only once. Alternatively, the apparatus may include means for starting transmission of HARQ A/N using a uplink control channel format (e.g. PUCCH format 3) capable to contain multiple bits, wherein bit positions are reserved for HARQ A/N for M DL subframes. In an embodiment, the apparatus may transmit each HARQ A/N up to M times. The PUCCH resource may be indicated in DL assignment for subframe #N or in a later DL assignment. In certain embodiments, the control channel may be an uplink control channel, such as PUCCH. In one embodiment, the apparatus is guaranteed the uplink control channel resource in M consecutive UL subframes.

BRIEF DESCRIPTION OF THE DRAWINGS

For proper understanding of the invention, reference should be made to the accompanying drawings, wherein:

FIG. 1 illustrates a principle of PUCCH resource allocation, according to an embodiment;

FIG. 2 illustrates a principle of PUCCH resource allocation, according to another embodiment;

FIG. 3 illustrates PUCCH resource allocation operation when LBT blocks transmission on some of the subframes, according to one embodiment;

FIG. 4 illustrates an alternative PUCCH resource allocation method, according to an embodiment;

FIG. 5 illustrates an example of HARQ A/N feedback ordering, according to an embodiment;

FIG. 6 illustrates an example of HARQ A/N feedback ordering, according to another embodiment;

FIG. 7 illustrates an example of opportunistic HARQ A/N feedback transmission after M LBT-blocked transmission opportunities, according to one embodiment;

DETAILED DESCRIPTION

Figure 8A:
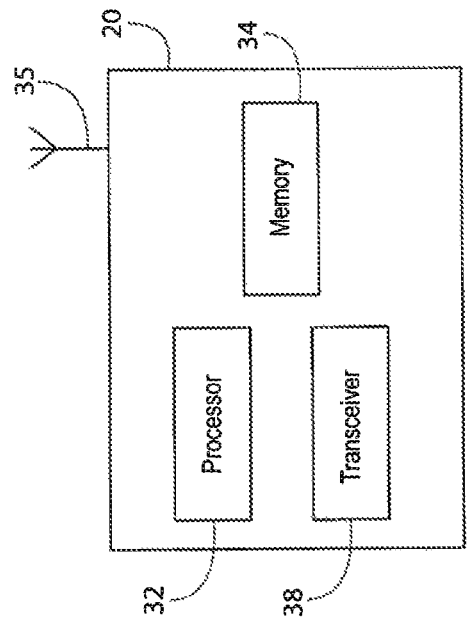
FIG. 8a illustrates an example block diagram of an apparatus, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for the transmission of uplink (UL) control information via unlicensed spectrum, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to Licensed Assisted Access (LAA) evolution, which is expected to happen in LTE Rel-14. More specifically, certain embodiments provide a framework for transmitting uplink control information via LAA cell or via unlicensed spectrum. The framework can be applied also for transmitting UCI (Uplink Control Information) via shared spectrum, where sharing may be managed by various mechanisms. The need may relate to specific scenarios of unlicensed band usage. An example of such scenario is dual connectivity where LAA cells may not be co-located with a cell on licensed spectrum and backhaul latency to the cell on licensed spectrum is too long to support carrier aggregation. Hence there is a need to support UCI/PUCCH transmission via unlicensed spectrum. Another potential use case is standalone LTE operation on unlicensed spectrum. These go beyond the scope of the ongoing Rel-13 LAA study item (SI) which provides: "An objective of the LAA SI (RP-141646) is to find a single global solution which enhances LTE to enable licensed-assisted access to unlicensed spectrum while coexisting with other technologies and fulfilling the regulatory requirements. Rel-13 focuses on LTE Carrier Aggregation configurations and architecture where one or more low power SCell(s) (i.e. based on regulatory power limits) operate in unlicensed spectrum and is either DL-only or contains UL and DL, and where the PCell operates in licensed spectrum and can be either LTE FDD or LTE TDD."

The standardized solution in Rel-13 based on CA framework is likely to be based on the transmission of Uplink Control Information (UCI), at least UCI transmitted on PUCCH on primary cell (PCell) (licensed band). However, there has been interest to see LAA with dual connectivity operation (i.e., assuming non-ideal backhaul between PCell in licensed spectrum and secondary cells (SCell(s)) in unlicensed spectrum) and even standalone LTE operation in unlicensed spectrum. These LAA modes will clearly need transmission of UCI/PUCCH in unlicensed spectrum.

Solutions standardized for the transmission of UCI/PUCCH in LTE rely on precise timing between each downlink transmission opportunity and the time for transmission of the corresponding control information (mainly hybrid automatic repeat request (HARQ)-acknowledgement (ACK)) in uplink.

Since transmission in unlicensed spectrum is subject to listen-before-talk (LBT) procedure, the unlicensed channel may be busy in the subframe where the UE is supposed to transmit uplink control information. Therefore, modifications to the standardized LTE mechanism to provide UCI on physical uplink control channel (PUCCH) and/or physical uplink shared channel (PUSCH) are needed in order to support LAA with dual connectivity and/or standalone LTE operation in unlicensed spectrum.

One specific problem related to UL transmission is that there is quite a limited time for the UE to prepare transmission containing UCI. It can be assumed that PUSCH can be dropped in the case when the UE is not allowed to transmit due to LBT, as the eNB can always schedule a retransmission. However, this may not be an acceptable approach for UCI (especially HARQ-ACK), due to the fact that UCI may cover HARQ-ACK for multiple LAA cells. When UE drops such UCI transmission, eNB needs to re-schedule corresponding PDSCH data transmissions on multiple LAA cells. Thus, as will be discussed in detail below, embodiments of the invention provide a framework for the transmission of uplink control information via unlicensed spectrum. It is noted that certain embodiments discussed herein focus on facilitating PUCCH transmission, especially HARQ-ACK on unlicensed spectrum. However, other embodiments can cover also other signals/channels, such as periodic channel state information (CSI) reporting, Scheduling request, physical random access channel and sounding reference signal (SRS). Also different combinations of uplink signals, e.g. HARQ-ACK and CSI and HARQ-ACK and SR can supported by certain embodiments.

Certain embodiments cover dynamic allocation of control channel resources, such as PUCCH resources in LTE, for the transmission of Hybrid Automatic Repeat Request (HARQ) acknowledgment/non-acknowledgement (A/N) in the unlicensed spectrum. One embodiment introduces multiple transmission opportunities for each HARQ A/N on PUCCH in multiple M UL subframes.

Figure 1:
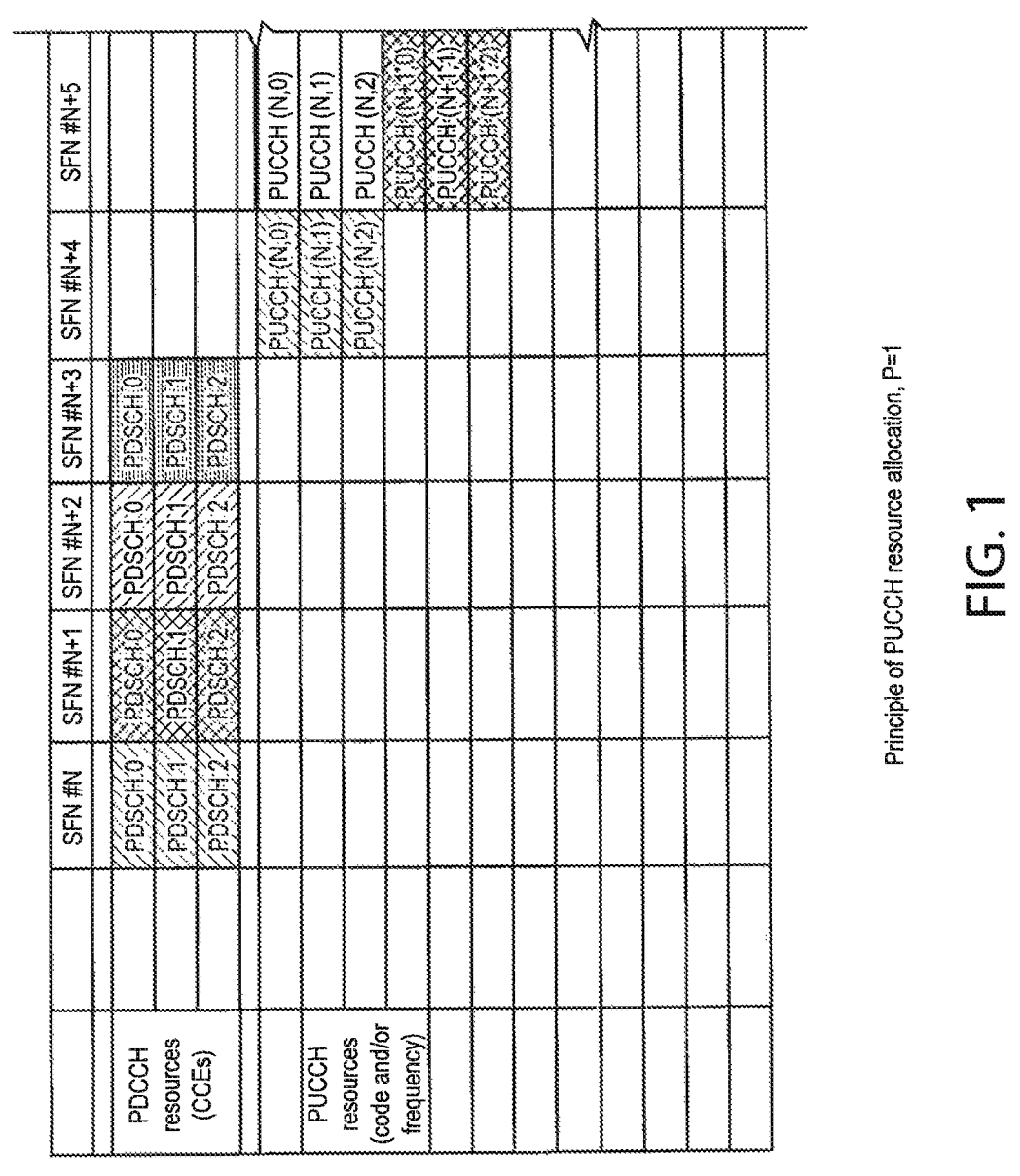

LTE utilizes so called implicit resource allocation for uplink HARQ-ACK resources corresponding to dynamically scheduled PDSCH. The idea in implicit allocation is that there is one-to-one mapping between the lowest PDCCH (or EPDCCH) control channel element index (CCE or eCCE) and the corresponding PUCCH Format 1a/1b resource carrying HARQ-ACK on predetermined subframe. According to an embodiment, the rule used for mapping from (e) control channel elements (CCEs) used on (E)PDCCH in subframe #N to dynamic A/N PUCCH resources used in UL subframe (#N+K) is changed compared to legacy LTE to ensure that HARQ A/N is mapped based on the same CCEs used in M consecutive DL subframes to different PUCCH resources. This kind of mapping may be needed, for example, in the case with PUCCH format 1/1a/1b type of HARQ-ACK feedback schemes. This is illustrated in FIG. 1 (for K=4). In particular, FIG. 1 illustrates a principle of PUCCH resource allocation, where P=1. FIG. 2 illustrates a principle of PUCCH resource allocation, where P=2. In these examples, parameter P (1/subframe) corresponds to the periodicity of PUCCH transmission opportunities provided.

In TDD, HARQ A/N feedback for potentially many DL subframes is mapped to single UL subframe with fixed timing. According to an embodiment, HARQ A/N feedback for each DL subframes is mapped to many UL subframe transmission opportunities with varying timing.

In this way, the UE scheduled for transmission in DL subframe #N is guaranteed PUCCH resources in M consecutive UL subframes. If the LBT procedure done by the UE just before UL subframe #N+K fails (or if the UE knows the corresponding subframe is not an UL subframe), the UE can repeat the same procedure for the next M−1 UL subframes and when the LBT procedure succeeds, start transmission of A/N using the PUCCH resources determined for DL subframe SFN #N. The UE will transmit each HARQ A/N only once.

According to another embodiment, there is a PUCCH opportunity every P subframes. This may be important in practice since due to European Telecommunications Standards Institute (ETSI) rules it might not be possible to support a Fixed Frame Period of 1 ms. In this case, the number of PUCCH opportunities a UE is guaranteed equals M/P, i.e., in case M=P there is only one opportunity for PUCCH transmission.

In yet another embodiment, bit positions may be reserved for each HARQ A/N in HARQ feedback contained, for example, on PUCCH format 3 or any other potential PUCCH format on multiple M UL subframes.

In one embodiment, multiplexing of the PUCCH resources may be made according to the principle shown in FIG. 1 discussed above and in FIG. 3. In particular, FIG. 3 illustrates PUCCH resource allocation operation when LBT blocks transmission on some of subframes (P=1). HARQ-ACK resources corresponding to certain DL subframe are in fixed position with respect to other DL subframes. This means that, when DL part ends, then the UE can prepare UCI to be transmitted. The format of UCI does not vary from UL subframe to UL subframe. This means that the UE does not need to prepare multiple UCI variants depending on the LBT success.

Figure 4:
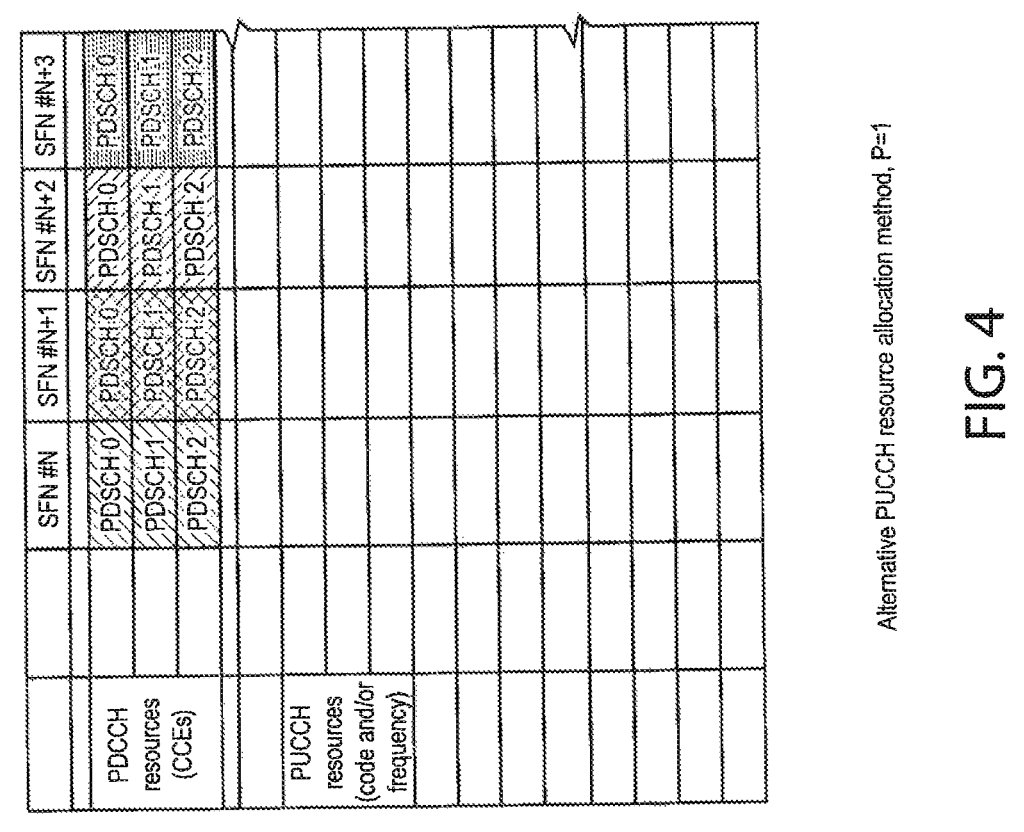

In an alternative embodiment, as illustrated in FIG. 4, HARQ A/N resources for DL subframe #N−4 are in a fixed position, and for DL subframe #N−5 in a fixed (another) position, etc. This means that PUCCH uses constantly the same UL resources when LBT does not block transmissions.

Figure 6:
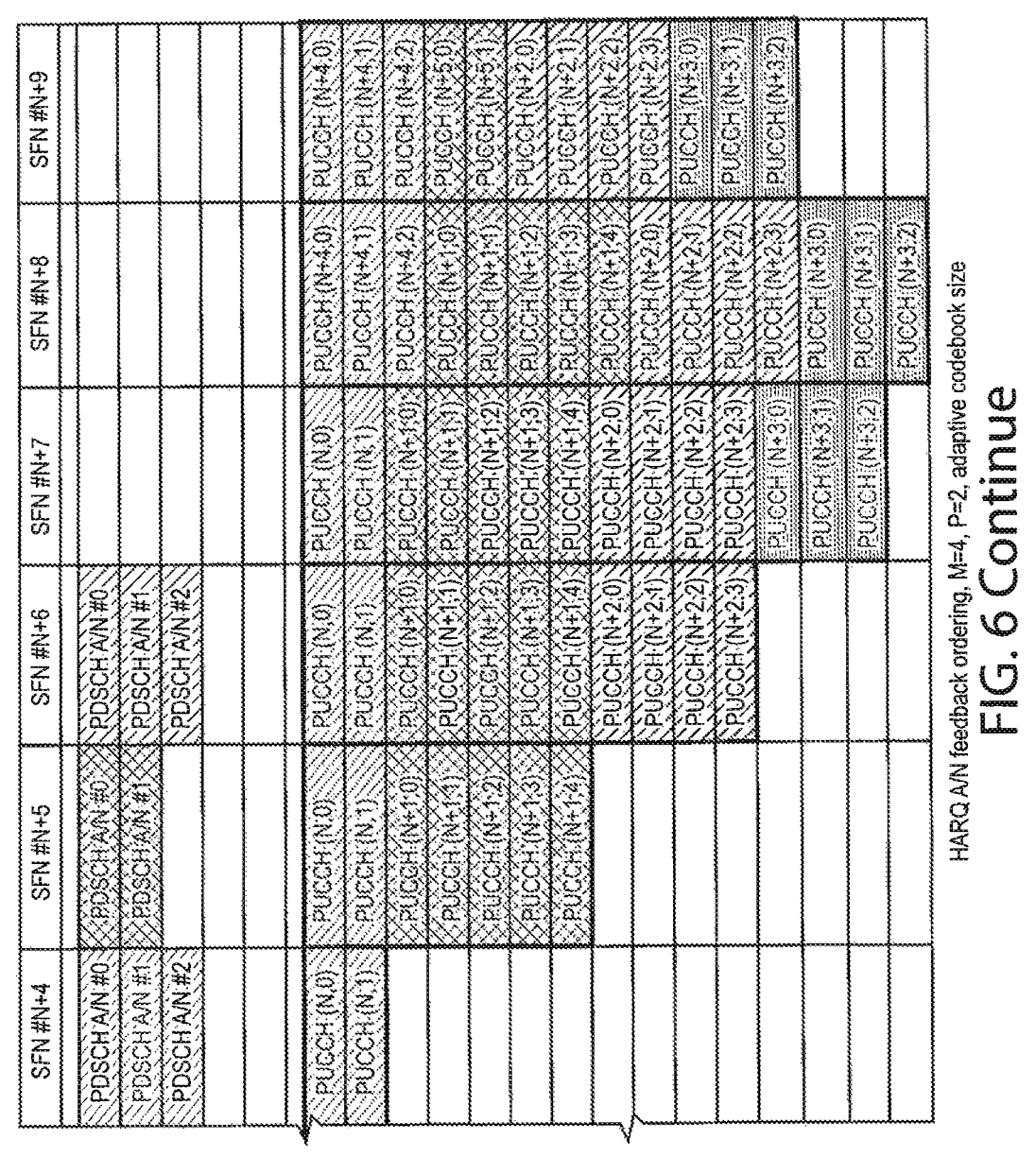

As mentioned above, embodiments may also be applied for other types of HARQ-A/N schemes, such as PUCCH format 3 or new PUCCH format considered in Rel-13 CA work item (WI). In that case, HARQ-A/N bits corresponding to different component carriers in a certain subframe are determined and ordered according to normal procedure (applied on licensed carriers). The blocks of HARQ A/N bits for different subframes are then ordered according to principle shown in FIGS. 5 and 6 for fixed and adaptive codebook size, respectively.

In an embodiment, codebook or HARQ A/N feedback size may be constant. Alternatively, if codebook adaptation is applied, the codebook size may be determined for each subframe according to a certain procedure. The applied codebook size may be determined as sum of codebook sizes for DL subframes N . . . N+M−1. Each HARQ A/N bit may be transmitted in every PUCCH transmission occurring during the M PUCCH transmission opportunities.

It is possible that the UE does not gain access to the channel during the M transmission opportunities for a certain HARQ A/N bit. In an embodiment, the UE may opportunistically transmit HARQ A/N even after the M transmission opportunities, for example, under the following conditions:
  UE uses PUCCH format 3 or new PUCCH format with a predetermined constant codebook size.
  UE receives DL assignment on subframe N+M . . . N+M+L that triggers PUCCH 3 or new PUCCH format transmission (where L is a preconfigured parameter)
  Bit position for the delay HARQ A/N bit is still vacant in the HARQ A/N feedback to be transmitted, and not overridden by HARQ A/N for a later DL assignment.

FIG. 7 illustrates an example of this opportunistic HARQ A/N feedback transmission after M LBT-blocked transmission opportunities, where M=4, P=2, fixed codebook size. As the UE will transmit a delayed HARQ A/N bit as long as the feedback bit position is not reserved by HARQ A/N for a later DL assignment, an error case occurs if the UE misses the overriding later DL assignment. The eNB can avoid the error case by not scheduling an overriding DL assignment during L following subframes.

In an embodiment of the invention, the actual presence of the UL subframes containing PUCCH resources may depend on the need. According to one embodiment, in case the resources (time) reserved for PUCCH are not needed, subframes can also be dynamically used for DL transmission.

FIG. 8a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. It should be noted that one of ordinary skill in the art would understand that apparatus 10 may include components or features not shown in FIG. 8a.

As illustrated in FIG. 8a, apparatus 10 includes a processor 22 for processing information and executing instructions or operations. Processor 22 may be any type of general or specific purpose processor. While a single processor 22 is shown in FIG. 8a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10.

Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, as mentioned above, apparatus 10 may be a network node or access node, such as a base station, node B, or eNB, or an access node of 5G, for example. According to one embodiment, apparatus 10 may be controlled by memory 14 and processor 22 to dynamically allocate control channel resources for the transmitting of UCI via the unlicensed or shared spectrum or via LAA cell. For example, in an embodiment, apparatus 10 may be controlled by memory 14 and processor 22 to schedule a UE with multiple transmission opportunities for each HARQ A/N on the control channel in multiple M UL subframes. In certain embodiments, the control channel may be an uplink control channel, such as PUCCH in LTE.

In certain embodiments, apparatus 10 may be controlled by memory 14 and processor 22 to map HARQ A/N based on the same CCEs used in M consecutive DL subframes to different control channel (e.g., PUCCH) resources. According to another embodiment, apparatus 10 may be controlled by memory 14 and processor 22 to map HARQ A/N feedback for each DL subframe to many UL subframe opportunities with varying timing.

In an embodiment, apparatus 10 may be controlled by memory 14 and processor 22 to guarantee the UE, which is scheduled for downlink data in DL subframe #N, PUCCH resources in M consecutive UL subframes. In another embodiment, apparatus 10 may be controlled by memory 14 and processor 22 to schedule a control channel (e.g., PUCCH) opportunity every P subframes, such that the number of control channel opportunities the UE is guaranteed equals M/P. According to yet another embodiment, apparatus 10 may be controlled by memory 14 and processor 22 to reserve bit positions for each HARQ A/N in HARQ feedback contained on a uplink control channel format (e.g., PUCCH format 3) on multiple M UL subframes. According to the embodiment, apparatus 10 may be controlled by memory 14 and processor 22 to guarantee the UE an uplink control channel resource in M consecutive UL subframes. The uplink control channel resource may be indicated in DL assignment for subframe #N or in a later DL assignment.

Figure 8B:
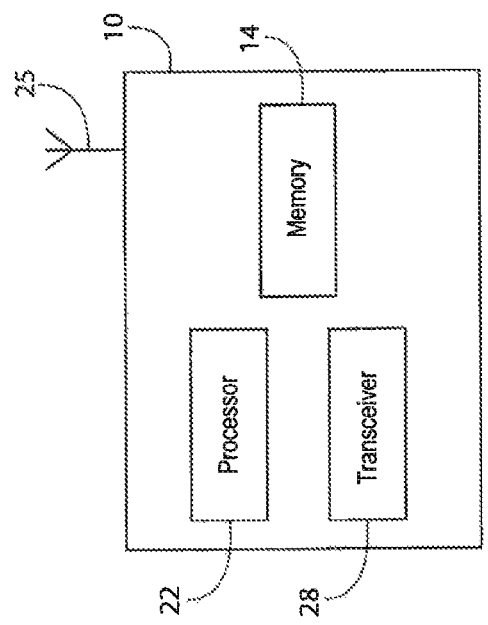
FIG. 8b illustrates an example block diagram of an apparatus, according to an embodiment.

FIG. 8b illustrates an example of an apparatus 20 according to another embodiment. In an embodiment, apparatus 20 may be a node or element in a communications network or associated with such a network, such as a UE, mobile device, mobile unit, or other device. For instance, in some embodiments, apparatus 20 may be a UE in LTE, LTE-A, or 5G. It should be noted that one of ordinary skill in the art would understand that apparatus 20 may include components or features not shown in FIG. 8b.

As illustrated in FIG. 8b, apparatus 20 includes a processor 32 for processing information and executing instructions or operations. Processor 32 may be any type of general or specific purpose processor. While a single processor 32 is shown in FIG. 8b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE. In this embodiment, apparatus 20 may be controlled by memory 34 and processor 32 to transmit UCI, via the unlicensed or shared spectrum or via the LAA cell, in at least one of multiple transmission opportunities scheduled by a network node (e.g., eNB). More specifically, according to an embodiment, apparatus 20 may be controlled by memory 34 and processor 32 to transmit HARQ A/N via the unlicensed or shared spectrum or via the LAA cell on control channel resources dynamically allocated by the network node. In certain embodiments, the control channel may be an uplink control channel, such as PUCCH in LTE.

According to one embodiment, apparatus 20 may be scheduled for downlink data in DL subframe #N and is guaranteed control channel (e.g., PUCCH) resources in M consecutive UL subframes. In this embodiment, if the LBT procedure performed by apparatus 20 just before UL subframe #N+K fails or if apparatus 20 knows the corresponding subframe is not an UL subframe, apparatus 20 may be controlled to repeat the same procedure for the next M−1 UL subframes.

When the LBT procedure succeeds, apparatus 20 may be controlled to start transmission of HARQ A/N using the control channel (e.g., PUCCH) resources determined for DL subframe SFN #N. In an embodiment, apparatus 20 may be controlled by memory 34 and processor 32 to transmit each HARQ A/N only once. Alternatively, apparatus 20 may be controlled to start transmission of HARQ A/N using an uplink control channel format (e.g. PUCCH format 3) capable to contain multiple bits, wherein bit positions are reserved for HARQ A/N for M DL subframes. In an embodiment, apparatus 20 may be controlled by memory 34 and processor 32 to transmit each HARQ A/N up to M times. The PUCCH resource may be indicated in DL assignment for subframe #N or in a later DL assignment.

In one embodiment, apparatus 20 may not be able to gain access to the channel during the M transmission opportunities for a certain HARQ A/N bit. In this embodiment, apparatus 20 may be controlled to opportunistically transmit HARQ A/N even after the M transmission opportunities, for example, under the following conditions: apparatus 20 uses a uplink control channel format, e.g. such as PUCCH format 3 or some other PUCCH format designed for carrying HARQ A/N, with a predetermined constant codebook size, apparatus 20 receives DL assignment on subframe N+M . . . N+M+L that triggers a uplink control channel format, e.g., such as PUCCH format 3, transmission (where L is a preconfigured parameter), and/or bit position for the delay HARQ A/N bit is still vacant in the HARQ A/N feedback to be transmitted and not overridden by HARQ A/N for a later DL assignment.

Figure 9A:
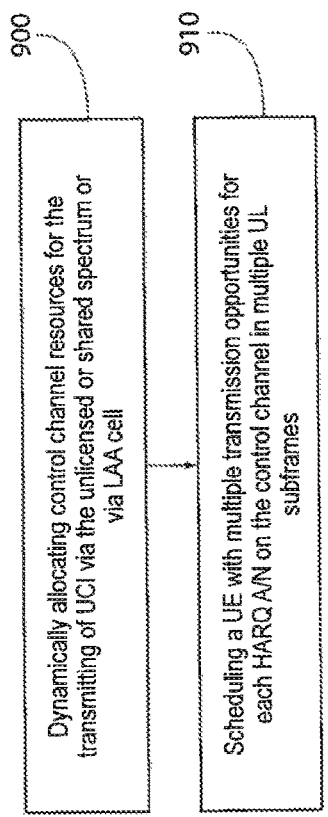
FIG. 9a illustrates an example flow diagram of a method, according to one embodiment.

FIG. 9a illustrates an example flow diagram of a method according to one embodiment. In an embodiment, the method of FIG. 9a may be executed by a network node or access node, such as a base station or eNB. As illustrated in FIG. 9a, the method may include, at 900, dynamically allocating control channel (e.g., PUCCH) resources for the transmitting of UCI via the unlicensed or shared spectrum or via the LAA cell. For example, in an embodiment, the method may include, at 910, scheduling a UE with multiple transmission opportunities for each HARQ A/N on the control channel (e.g., PUCCH) in multiple UL subframes.

In certain embodiments, the method may include mapping HARQ A/N based on the same CCEs used in M consecutive DL subframes to different uplink control channel resources. According to another embodiment, the method may include mapping HARQ A/N feedback for each DL subframe to many UL subframe opportunities with varying timing.

In one embodiment, the method may include guaranteeing the UE, which is scheduled for downlink data in DL subframe #N, uplink control channel resources in M consecutive UL subframes. In another embodiment, the method may include scheduling a uplink control channel opportunity every P subframes, such that the number of uplink control channel opportunities the UE is guaranteed equals M/P. According to yet another embodiment, the method may include reserving bit positions for each HARQ A/N in HARQ feedback contained on a uplink control channel format (e.g. PUCCH format 3) on multiple M UL subframes.

Figure 9B:
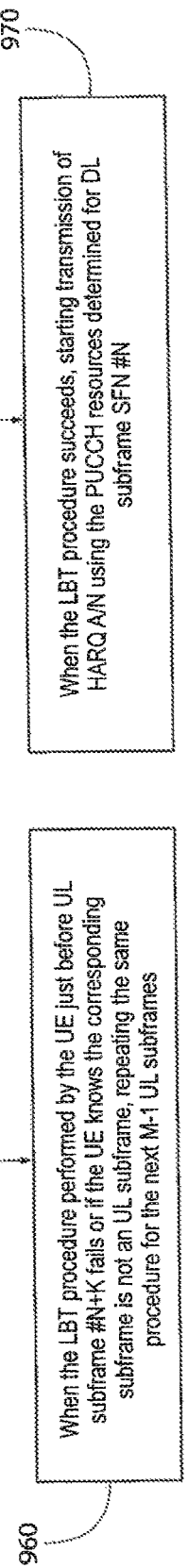
FIG. 9b illustrates an example flow diagram of a method, according to another embodiment.

FIG. 9b illustrates an example flow diagram of a method according to another embodiment. In an embodiment, the method of FIG. 9b may be executed by a mobile device, such as a UE. As illustrated in FIG. 9b, the method may include, at 950, transmitting UCI via the unlicensed or shared spectrum or via the LAA cell in at least one of multiple transmission opportunities scheduled by a network node (e.g., eNB). More specifically, according to an embodiment, the transmitting may include transmitting HARQ A/N via the unlicensed or shared spectrum or via the LAA cell on control channel (e.g., PUCCH) resources dynamically allocated by the network node.

According to one embodiment, the UE may be scheduled for transmission in DL subframe #N and is guaranteed control channel (e.g., PUCCH) resources in M consecutive UL subframes. In this embodiment, if the LBT procedure performed by the UE just before UL subframe #N+K fails or if the UE knows the corresponding subframe is not an UL subframe, the method may include, at 960, repeating the same procedure for the next M−1 UL subframes.

When the LBT procedure succeeds, the method may include, at 970, starting transmission of HARQ A/N using the uplink control channel resources determined for DL subframe SFN #N. In an embodiment, the UE transmits each HARQ A/N only once. Alternatively, the method may include starting transmission of HARQ A/N using a uplink control channel format (e.g. PUCCH format 3) capable to contain multiple bits, wherein bit positions are reserved for HARQ A/N for M DL subframes. In an embodiment, the UE may transmit each HARQ A/N up to M times. The PUCCH resource may be indicated in DL assignment for subframe #N or in a later DL assignment.

In one embodiment, if the UE does not gain access to the channel during the M transmission opportunities for a certain HARQ A/N bit, the method may include opportunistically transmitting HARQ A/N even after the M transmission opportunities, for example, under the following conditions: UE uses a uplink control channel format (e.g. PUCCH format 3) with a predetermined constant codebook size, UE receives DL assignment on subframe N+M . . . N+M+K that triggers uplink control channel format transmission (where K is a preconfigured parameter), and/or bit position for the delay HARQ A/N bit is still vacant in the HARQ A/N feedback to be transmitted and not overridden by HARQ A/N for a later DL assignment.

In some embodiments, the functionality of any of the methods described herein, such as those illustrated in FIGS. 9a and 9b discussed above, may be implemented by software and/or computer program code or portions of it stored in memory or other computer readable or tangible media, and executed by a processor. In some embodiments, the apparatuses described herein may be, included or be associated with at least one software application, module, unit or entity configured as arithmetic operation(s), or as a program or portions of it (including an added or updated software routine), executed by at least one operation processor.

Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

In an exemplary embodiment, an apparatus, such as a user equipment or base station, may include means for carrying out embodiments described above and any combination thereof.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   wherein the at least one memory and computer program code are configured, with the at least one processor, to cause the apparatus at least to
   transmit uplink control information in at least one of multiple transmission opportunities scheduled by a network node,
   wherein the transmitting comprises transmitting, depending on a success of a listen-before-talk procedure, a hybrid automatic repeat request acknowledgement/non-acknowledgement on control channel resources allocated by the network node, and
   wherein said multiple transmission opportunities are scheduled for each hybrid automatic repeat request acknowledgement/non-acknowledgement on the control channel.

2. The apparatus according to claim 1, wherein the transmitting further comprises transmitting the uplink control information via an unlicensed or shared spectrum, via a licensed assisted access cell, or via a cell employing the listen-before-talk procedure.

3. The apparatus according to claim 1, wherein the user equipment is scheduled for downlink data in a downlink subframe #N and is guaranteed control channel resources in M consecutive uplink subframes.

4. The apparatus according to claim 3, wherein, when the listen-before-talk procedure performed by the user equipment before uplink subframe #N+K fails, the at least one memory and the computer program code are further configured, with the at least one processor, to cause the apparatus at least to repeat the listen-before-talk procedure for next M−1 uplink subframes.

5. The apparatus according to claim 4, wherein, when the listen before talk procedure succeeds, the at least one memory and the computer program code are further configured, with the at least one processor, to cause the apparatus at least to start transmission of the hybrid automatic repeat request acknowledgement/non-acknowledgement using the control channel resources determined for the downlink subframe #N.

6. The apparatus according to claims 1, wherein the transmitting further comprises transmitting the hybrid automatic repeat request acknowledgement/non-acknowledgement only once.

7. The apparatus according to claim 1, wherein the transmitting further comprises transmitting the hybrid automatic repeat request acknowledgement/non-acknowledgement multiple times.

8. The apparatus according to claim 1, wherein the at least one memory and the computer program code are further configured, with the at least one processor, to cause the apparatus at least to transmit the hybrid automatic repeat request acknowledgement/non-acknowledgement using a uplink control channel format capable of containing multiple bits, wherein bit positions are reserved for the hybrid automatic repeat request acknowledgement/non-acknowledgement for multiple downlink subframes.

9. The apparatus according to claims 1, wherein the user equipment is allocated the uplink control channel resource in multiple consecutive uplink subframes.

10. A method, comprising:
    transmitting, by a user equipment, uplink control information m at least one of multiple transmission opportunities scheduled by a network node,
    wherein the transmitting comprises transmitting, depending on a success of a listen-before-talk procedure, a hybrid automatic repeat request acknowledgement/non-acknowledgement on a uplink control channel resource allocated by the network node, and wherein said multiple transmission opportunities are scheduled for each hybrid automatic repeat request acknowledgement/non-acknowledgement on the control channel.

11. The method according to claim 10, wherein the transmitting further comprises transmitting the uplink control information via an unlicensed or shared spectrum, via a licensed assisted access cell, or via a cell employing the listen-before-talk procedure.

12. The method according to claim 10, wherein the user equipment is scheduled for downlink data in a downlink subframe #N and is guaranteed control channel resources in M consecutive uplink subframes.

13. The method according to claim 12, wherein, when the listen-before-talk procedure performed by the user equipment before uplink subframe #N+K fails, the method further comprises repeating the listen-before-talk procedure for next M−1 uplink subframes.

14. The method according to claim 13, wherein, when the listen-before-talk procedure succeeds, the method further comprises starting transmission of hybrid automatic repeat request acknowledgement/non-acknowledgement using the control channel resources determined for the downlink subframe #N.

15. The method according to claim 10, wherein the transmitting further comprises transmitting the hybrid automatic repeat request acknowledgement/non-acknowledgement only once.

16. The method according to claim 10, wherein the transmitting further comprises transmitting the hybrid automatic repeat request acknowledgement/non-acknowledgement multiple times.

17. The method according to claim 10, further comprising transmitting the hybrid automatic repeat request acknowledgement/non-acknowledgement using a uplink control channel format capable of containing multiple bits, wherein bit positions are reserved for the hybrid automatic repeat request acknowledgement/non-acknowledgement for multiple downlink subframes.

18. An apparatus, comprising:
at least one processor; and
at least one memory including computer program code, wherein the at least one memory and computer program code are configured, with the at least one processor, to cause the apparatus at least to
allocate control channel resources for transmitting uplink control information;
schedule a user equipment with multiple transmission opportunities for a hybrid automatic repeat request acknowledgement/non-acknowledgement; and
receive, depending on a success of a listen-before-talk procedure, the hybrid automatic repeat request acknowledgement/non-acknowledgement on a uplink control channel resource allocated by the apparatus, wherein said multiple transmission opportunities are scheduled for each hybrid automatic repeat request acknowledgement/non-acknowledgement on the control channel.

19. The apparatus according to claim 18, wherein the at least one memory and the computer program code are further configured, with the at least one processor, to cause the apparatus at least to receive the hybrid automatic repeat request acknowledgement/non-acknowledgement only once.

20. The apparatus according to claim 18, wherein the at least one memory and the computer program code are further configured, with the at least one processor, to cause the apparatus at least to receive the hybrid automatic repeat request acknowledgement/non-acknowledgement multiple times.

* * * * *